Feb. 13, 1968  J. E. DUEKER  3,369,125
OPTICAL FIBER ELECTROLUMINESCENT-PHOTOCONDUCTIVE
IMAGE INTENSIFIER
Filed Sept. 9, 1963
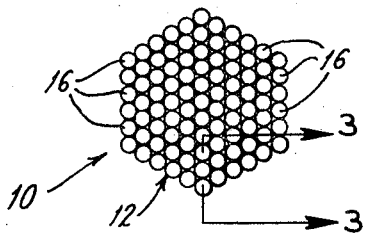
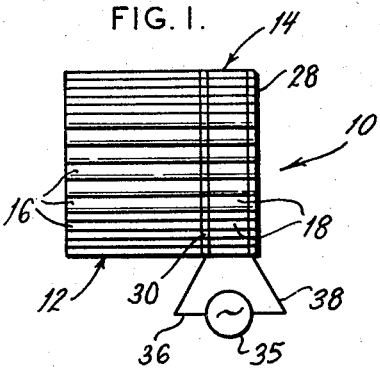
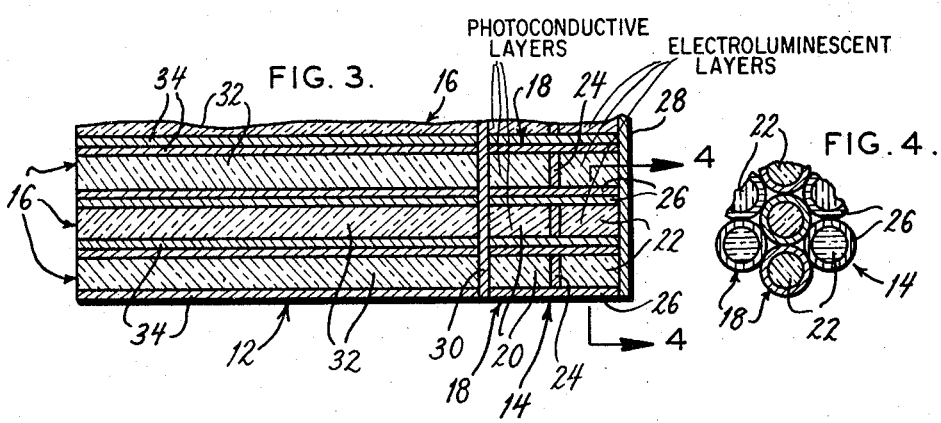
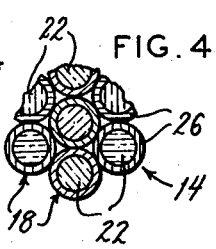
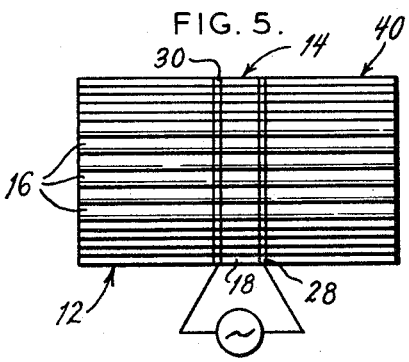
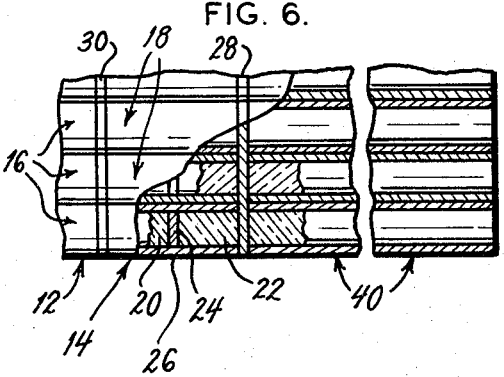
INVENTOR.
JAMES E. DUEKER
BY
Gravely, Lieder & Woodruff
ATTORNEYS United States Patent Office 3,369,125
Patented Feb. 13, 1968

3,369,125
OPTICAL FIBER ELECTROLUMINESCENT-PHOTO-CONDUCTIVE IMAGE INTENSIFIER
James E. Dueker, St. Louis County, Mo., assignor to McDonnell Aircraft Corporation, St. Louis County, Mo., a corporation of Maryland
Filed Sept. 9, 1963, Ser. No. 307,695
17 Claims. (Cl. 250—213)

The subject invention relates generally to electro-optical devices, and more particularly to an image intensifier device combined with optical fibers and to the method of making same.

Image intensifiers, sometimes called light amplifiers, have been constructed heretofore and some of the known devices have employed semi-conductor materials and the like and have also been constructed of a plurality of individual cells each of which is optically isolated from the others. Image intensifiers have also been employed heretofore in conjunction with optical fibers. The known constructions, however, are difficult, time consuming and expensive to make, are unreliable, and are difficult to control accurately. Furthermore, in all of the known constructions a relatively large portion of the usable surface area is taken up by optical shielding devices of various kinds leaving a relatively small portion of the total area available for light amplification and image intensification.

Briefly, this invention contemplates overcoming these and other disadvantages and shortcomings of known image intensifier devices and the like and known methods of making the same by providing an image intensifier device constructed of a plurality of individual intensifier cells each of which is optically isolated from the others. The present device also includes improved means for making electrical connections to the individual cells and improved means for combining the subject device with optical fibers or the like. Furthermore, the present intensifiers are relatively inexpensive to make and use, and the subject devices can be made to meet a variety of different operating conditions. The present devices are also relatively rugged, light weight, and compact. The present invention also covers a novel method of making image intensifiers and of combining image intensifiers with optical fibers or the like.

It is therefore a principal object of the present invention to provide improved means for combining image intensifier devices and optical fibers.

Another object is to provide an improved method of making image intensifiers combined with optical fibers.

Another object is to provide improved means for optically isolating individual image intensifier cells in an image intensifier device.

Another object is to improve the optical acuity characteristics of light magnifying devices.

Another object is to provide a light amplifier capable of producing a visible image from visible or invisible images.

Another object is to improve the light magnification characteristics of image intensifier devices and the like.

Another object is to provide improved means for making electrical connections to an image intensifier device.

Another object is to provide an image intensifier device that has relatively uniform operating characteristics over the entire surface area thereof.

Another object is to provide an improved method of making multi-cell image intensifier devices which lends itself to making the individual cells in different sizes and shapes.

Another object is to improve the optical resolution characteristics of image intensifiers.

Another object is to reduce the cost of making image intensifiers and the like.

These and other objects and advantages of the present invention will become apparent after considering the following detailed specification of a preferred embodiment thereof in conjunction with the accompanying drawing, wherein:

FIG. 1 is a side elevational view of an image intensifier device constructed according to the present invention;

FIG. 2 is an end view of the intensifier of FIG. 1 as seen from the left therein;

FIG. 3 is an enlarged fragmentary view taken on line 3—3 of FIG. 2;

FIG. 4 is an enlarged fragmentary cross-sectional view taken on line 4—4 of FIG. 3;

FIG. 5 is a side elevational view showing a modified form of the subject image intensifier device; and FIG. 6 is a fragmentary cross-sectional view taken through the center of the intensifier device of FIG. 5.

Referring to the drawing by reference numbers, the number 10 refers generally to an image intensifier device, also known as a light amplifier, constructed according to the present invention. The device includes a bundle of fibers identified generally by the number 12 and a corresponding number of image intensifier elements each of which is in alignment with a corresponding fiber in the fiber bundle 12. The image intensifier elements are also arranged in a bundle identified generally by the number 14. The individual fibers are identified by number 16 and the individual image intensifiers by the number 18.

Each of the intensifier cells includes a layer of photoconducting material 20, a layer of electroluminescent material 22, and a layer of material 24 positioned therebetween. The layer 24 is constructed of material having predetermined optical opacity characteristics and provides the mechanical support for the layers 20 and 22 which are formed thereon by evaporation and deposition, sputtering or by some other suitable method or means.

Each of the individual intensifier elements or cells 18 is also provided with a layer 26 of non-light conducting and non-electrical conducting material which extends around the periphery thereof. The layers 26 prevent optical communication between the various cells.

The cells 18, like the fibers 16, are arranged in the wafer or bundle 14 as aforesaid with the corresponding layers of all of the cells arranged respectively in the same planes, and also with the opposite surfaces thereof in the same plane. A transparent layer of electrical conducting material 28 is attached to the end of the bundle 14 adjacent to the electro luminescent layers 22, and another transparent electrical conducting layer 30 is attached to the opposite end of the bundle in contact with the photoconducting layers 20 in each of the cells 18. The fiber bundle 12 is then attached to the electrical conducting layer 30 and extends outwardly therefrom as shown in FIG. 3. It is also contemplated to attach a cell 18 to each fiber before the fibers are bundled. It is preferable, although not essential, to have each fiber 16 aligned respectively with a corresponding cell 18 to improve the resolution and acuity characteristics of the device and each fiber 16 is composed of a light conducting material 32 surrounded by a layer 34 which is preferably non-light conducting.

An image from a remote image-forming device or source (not shown) is directed toward the end of the fiber bundle 12 opposite from the intensifier wafer 14. The image can be formed of visible or invisible radiation energy such as an ordinary light image, an infra-red image, an ultraviolet image or an X-ray image to mention a few. The radiation image is transmitted through the fibers to the cells 18 of the intensifier wafer 14 on the side thereof associated with the photoconducting layers 20. The wafer then converts and amplifies the incoming image to produce a visible image in the electroluminescent layers 22. The image thus produced is equivalent in shape and half-tone quality to the input image but is intensified and made visible and can be observed on the transparent conductor layer 28. The amount of image intensification can also be controlled as will be shown.

In the usual intensifier unit the materials are selected from the group generally referred to as semi-conductors although it is not intended to limit the construction of the present intensifier to semi-conductors since other materials having different conductivity characteristics can also be used with varying results.

In order to accurately control the intensity or amplification of the output, the two transparent electrical conducting layers 28 and 30 are connected across a source of adjustable controlled voltage 35 by leads 36 and 38 as shown in FIG. 1. By increasing the voltage, the intensity of the image on the output layer 28 is increased and vice versa. Furthermore, by having layers such as the layers 24 of predetermined opacity in each of the cells 18 the output visible image will in part be fed back to the input layers 20, and this in turn will improve the amplification characteristics of the device. It should be noted in this connection that when the image is stronger in one cell than in another a greater portion of the output will be fed back, and hence, the amplification of the cells having higher intensity outputs will be greater than the cells receiving a less strong input image. This will accentuate the contrast between cells having different input signals.

If, for example, an invisible infrared or ultraviolet input image is projected onto the input end of the fiber bundle 12, the image will be transmitted thereby to the wafer 14. Furthermore, if each fiber is associated with a different image intensifier cell 18 each cell will operate independently of the other cells and amplify only that portion of light impinging thereon. The invisible input to each cell will then be amplified and appear as a visible image on the output side of the intensifier 14. As already noted, some of this visible radiation travels back from the electroluminescent layers through the controlled layer 24 into the photoconducting layer 20. This optical feedback increases the gain of the cells 18 and can be varied by varying the opacity of the material in layers 24. It is important that the opacity of the layer 24 be carefully selected since optical feed-back above a certain level removes the half-tone capability of the intensifier. Also optical feed-back above a certain level can be used to produce an image storage capability.

Some of the advantages of using fibers in conjunction with an image intensifier wafer or element constructed as described above include the fact that the subject device can be operated using an image forming means having a relatively low $f$ number. This in itself greatly increases the possible uses for the subject device. Also the shape of the fiber bundle and the intensifier wafer can be constructed to match the shape of almost any image. Furthermore, the subject device has better resolution and acuity characteristics than are obtainable with other known devices including segmented image panels.

The construction of the subject device is also relatively simple because the intensifier elements can be formed by known techniques including evaporation and deposition or sputtering techniques, and similar techniques can also be used to attach the intensifier elements to the ends of the fibers. These techniques also lend themselves to fabricating individual fibers with attached cells which can then be optically isolated and attached to each other using an opaque adhesive for the coating material 26. This makes possible miniaturization and micro-miniaturization of the subject image intensifier devices beyond what is obtainable by dissecting a larger area intensifier and reforming it into separate optically isolated elements. Miniaturization and micro-miniaturization also improves the acuity and resolution characteristics. The cross-sectional shape of the fibers and cells and the length thereof can also be varied as required.

FIGS. 5 and 6 show a modified form of the subject device which includes providing a second or output bundle of fibers 40 similar to the bundle 12 but attached to the opposite side of the intensified wafer 14. Except for the addition of the second fiber bundle 40, the modified construction is similar to the construction 10 shown in FIG. 1. The position of the fiber ends in the output bundle need not match in a one to one ratio the elements of the image intensifier 14. However, the highest resolution obtainable occurs when a one to one relationship is obtained. The use of the second bundle makes it possible to change the size and relative location of the final visible image with relative simplicity compared to more conventional optical devices.

Both forms of the subject construction can be made relatively directional and can be used to receive images from remote locations. The subject devices are also capable of receiving light images of many different frequencies including visible, invisible and X-ray images as already noted. The subject devices also have many uses and applications and it is not intended to restrict them to any particular use or application.

Thus there has been shown and described a novel image intensifier device employing fiber optics in conjunction therewith to develop certain desirable characteristics which fulfills all of the objects and advantages sought therefor. Many changes, modifications, variations, and other uses and applications for the subject device will, however, become apparent to those skilled in the art after considering this disclosure and the accompanying drawing. All such changes, modifications, variations, and other uses and applications of the device which do not depart from the spirit and scope of the invention are deemed to be covered by the invention which is limited only by the claims which follow.

What is claimed is:

1. An image intensifier device comprising an elongated optical fiber capable of conducting light therealong, said optical fiber having spaced end surfaces and a side surface extending therebetween, means forming a layer on the side surface of the fiber to optically isolate said fiber from the surrounding light, and an image intensifier cell attached to one end surface of the fiber, said cell including a first layer of material having photoconducting properties, a second layer of material having electroluminescent properties, and a third layer of material having predetermined optical absorbing properties positioned therebetween to allow a predetermined optical feedback between the first and second layers, a coating of opaque material around the periphery of said cell optically isolating said first, second and third cell layers from the surrounding light, a first layer of transparent electrical conducting material positioned between said first cell layer and said one end surface of the fiber, and a second layer of transparent electrical conducting material attached to the opposite side of the cell from the first transparent layer.

2. The image intensifier device defined in claim 1 wherein a second light conducting optical fiber similar to the aforesaid optical fiber is attached to said image intensifier cell on the opposite side thereof from the aforesaid fiber.

3. The image intensifier device defined in claim 1 wherein said photoconducting layer and said electroluminescent layer are formed of solid state materials.

4. The image intensifier device defined in claim 1 wherein a controllable voltage source is connected between said first and said second transparent layers of electrical conducting material to control the operating characteristics of said image intensifier cell.

5. The image intensifier device defined in claim 1 wherein said fiber is capable of transmitting visible as well as invisible light.

6. An image intensifier device comprising a plurality of fibers capable of transmitting visible and invisible light therethrough, said fibers being arranged in a bundle, and a plurality of image intensifier cells attached to one end of said fiber bundle, each of said image intensifier cells including a first layer of material having photoconducting properties positioned adjacent to the fiber bundle, a second layer of material having electroluminescent properties, and a third layer of material having predetermined optical absorbing characteristics positioned between said first and said second layers, a coating of opaque material around the periphery of each of said cells to optically isolate each of said cells from the others, a first electrical conductor layer of light conducting material positioned between the photoconducting layers of each cell and the said one end of the fiber bundle, and a second electrical conductor layer of light conducting material attached to the electroluminescent layers of said cel's on the opposite sides thereof from said first conductor layer, said first and second electrical conducting layers respectively in all of said cells being electrically connected together.

7. The image intensifier device defined in claim 6 wherein an adjustable voltage source is connected across said first and second electrical conductor layers.

8. The image intensifier device defined in claim 6 wherein said cells have substantially the same cross-sectional size and shape as the individual fibers in the bundle and are arranged in alignment respectively with each of said fibers in the bundle.

9. The image intensifier device defined in claim 6 wherein the corresponding layers of said cells are arranged respectively in the same planes.

10. The image intensifier device defined in claim 6 wherein a second bundle of fibers similar in structure to the aforementioned fiber bundle is attached to the opposite sides of said cells from the aforementioned bundle.

11. The image intensifier device defined in claim 10 wherein the fibers in said second bundle are in longitudinal alignment with corresponding fibers in the aforementioned bundle.

12. An image intensifier device comprising a plurality of fibers arranged in a bundle and capable of transmitting light therethrough, and an image intensifier wafer attached to one end of said fiber bundle, said wafer including a plurality of coplanar cells each of which has a cross-sectional area corresponding to the cross-sectional area corresponding to the cross-sectional area of a corresponding one of the fibers in the bundles, each of said cells including a first layer of material having photoconducting properties positioned adjacent to the corresponding fiber in the fiber bundle, a second layer of material having electroluminescent properties, and a third layer of material having predetermined opacity characteristics positioned therebetween, a coating of non-light conducting material around each of said cells to optically isolate each cell from the other cells in the wafer, a first layer of transparent electrical conducting material positioned between the photoconducting layers in each of said cells and the corresponding fibers in the bundle, and a second layer of transparent electrical conducting material attached to said electroluminescent layers of said cells on the opposite sides thereof from the first conductor layer.

13. The image intensifier device defined in claim 12 wherein a second bundle of fibers having substantially the same area dimensions as the aforementioned fiber bundle is attached to said wafer on the opposite side thereof from said aforementioned fiber bundle.

14. The image intensifier device defined in claim 12 wherein said fibers and said cells are cylindrical in shape and said fibers are capable of transmitting visible and invisible light therethrough.

15. An image intensifier device comprising a plurality of fibers arranged in a bundle and capable of transmitting light of all frequencies therethrough, and a wafer attached to one end of said fiber bundles including a plurality of image intensifier cells each including a first layer of material having photoconducting properties, a second layer of material having electroluminescent properties, and a third layer of material having predetermined optical absorbing properties positioned therebetween, a coating of opaque material around the periphery of each of said cells, a first layer of transparent electrical conducting material positioned between the photoconducting layers of said cells and the said one end of the fiber bundle, and a second layer of transparent electrical conducting material attached to the electroluminescent layer on the opposite side of the said cells from the first transparent layer, means for impinging an incident light image on a plurality of said fibers whereby said plurality of fibers transmits corresponding portions of said light image therealong to the photoconducting layers of corresponding ones of said cells whereby said cells produce a visible image thereof on the electroluminescent layers, a source of adjustable voltage connected across said first and second transparent electrical conducting layers to control the intensity of the image produced in the electroluminescent layers, a portion of said produced illumination being fed back to the corresponding photoconducting layers of said cells to further increase the intensity of the image in the electroluminescent layer, the intensity of said feedback illumination being controlled by the light conducting properties of said third layer of optical absorbing material.

16. The image intensifier device defined in claim 15 wherein a second bundle of fibers is attached to said wafer on the opposite side thereof from the aforesaid bundle.

17. An image intensifier device comprising a fiber capable of transmitting light, and an image intensifier cell attached to one end of the fiber, said cell including a first layer of material having photoconducting properties, a second layer of material having electroluminescent properties and a third layer of material having predetermined optical absorbing properties positioned therebetween to allow a predetermined optical feedback, a coating of opaque material around the periphery of said cell, a first layer of transparent electrical conducting material positioned between said cell and said one end of the fiber, and a second layer of transparent electrical conducting material attached to the opposite side of the cell from the first transparent layer, a plurality of said fibers each with a cell attached thereto being arranged in a bundle of predetermined size and shape with the corresponding layers of material in the cells being arranged to be coplanar and with the first and second transparent electrical conducting layers respectively of all the cells being in electrical communication.

References Cited
UNITED STATES PATENTS

| | | | |
|---|---|---|---|
| 2,792,447 | 5/1957 | Kazan | 250—213 X |
| 2,833,936 | 5/1958 | Ress | 250—227 X |
| 3,171,965 | 3/1965 | McNaney | 750—227 |
| 3,215,846 | 11/1965 | McNaney | 250—213 |

RALPH G. NILSON, *Primary Examiner.*

J. D. WALL, *Assistant Examiner.*